3,433,735
SOLVENT DISPERSE PHASE EXTRACTION OF
AROMATIC HYDROCARBONS
Donald B. Broughton, Evanston, Ill., assignor to Universal Oil Products Company, Des Plaines, Ill., a corporation of Delaware
Filed Sept. 29, 1966, Ser. No. 583,041
U.S. Cl. 208—325    4 Claims
Int. Cl. C10g 21/12

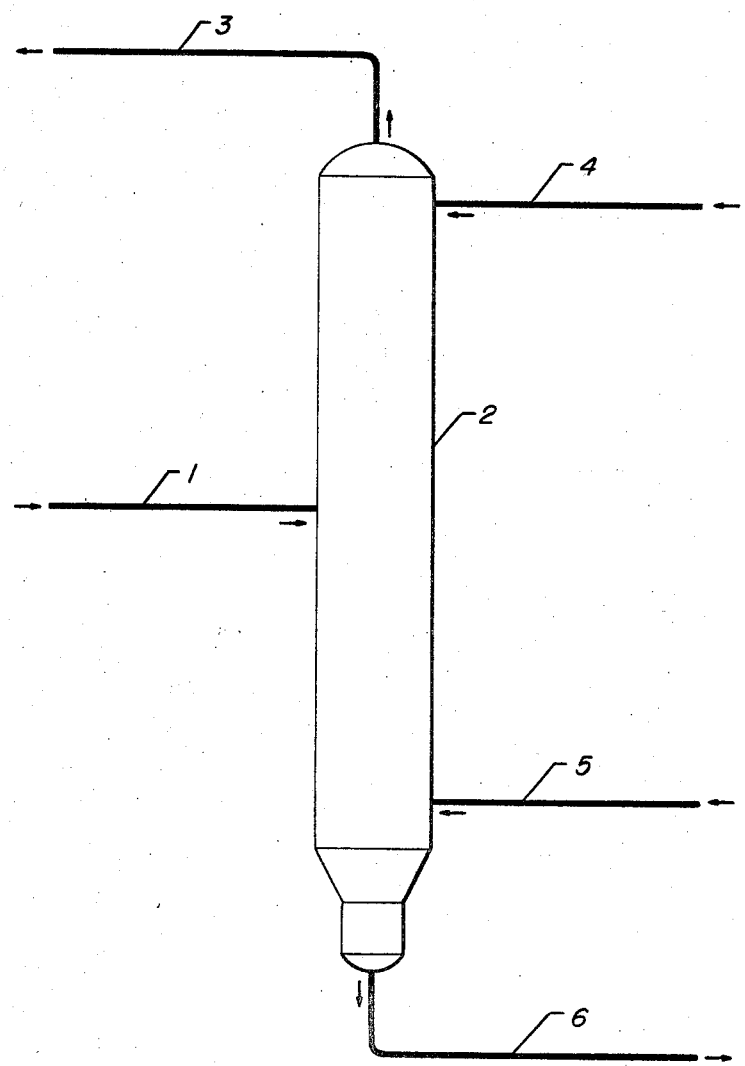

ABSTRACT OF THE DISCLOSURE

The present invention relates to an aromatic hydrocarbon extraction process, and more particularly to an operation wherein the extraction means is maintained with hydrocarbon as the continuous phase and with solvent selective for monocyclic aromatics as the dispersed phase. Where the extractor comprises a rotating disc contactor, the aromatic extraction process utilizes a solvent selective for monocyclic aromatics which may be selected from the group consisting of sulfolane solvents, sulfolane-type solvents, sulfolene solvents, and polyalkylene glycol solvents.

---

The present invention relates to the solvent extraction of aromatic hydrocarbons from a mixed hydrocarbon feed stock. Most particularly, the present invention relates to the extraction of aromatics from the feed stock by a solvent composition comprising a sulfolane-type chemical.

The recovery of aromatic hydrocarbons, such as benzene, toluene and xylenes, from catalytic reformates and other hydrocarbon fractions by solvent extraction is a commercially important refinery operation in the hydrocarbon processing industry, and a recent development in this art has been the use of sulfolane as the primary solvent. The sulfolane solvent has selectivity and solvency advantages, e.g., less utility costs, over other solvents used in the prior art extraction processes. A considerable number of new commercial aromatic recovery plants have therefore utilized the sulfolane extraction process and the technical and economic success of these units is now well known in the industry.

It has been the practice in applications of the sulfolane extraction process to employ a rotating disc contactor (RDC) as the extractor means and to operate the system with the solvent as the continuous phase and with the hydrocarbon as the dispersed phase within the extractor. (See the Oil and Gas Journal, Nov. 22, 1965, vol. 63, p. 80). According to the teachings of the prior art, the extraction process must be operated with the solvent as the continuous phase in order to minimize the extent of axial-mixing or back-mixing of the solvent and hydrocarbon phases which reduces the effectiveness of the extraction step. The terms 'axial-mixing" and "back-mixing" refer to the phenomenon whereby the flowing liquid does not pass through the extractor in a direct flow, but tends to circulate in vertical eddy currents, thus returning in part to lower regions of the extractor column through which the liquid has previously passed.

It is therefore an object of the present invention to recover aromatic hydrocarbons from a mixed hydrocarbon feed in a solvent extraction process utilizing a sulfolane-type solvent. It is another object of the present invention to recover aromatic hydrocarbons from a mixed hydrocarbon feed in a solvent extraction process utilizing a rotating disc contactor as the extraction zone. It is a further object of the present invention to recover aromatic hydrocarbons from a mixed hydrocarbon feed in a more economical and facile manner.

Recent investigation upon a commercially operating aromatics extraction unit has now disclosed that contrary to the anticipated loss of effectiveness, operation of the extractor with the sulfolane solvent as the dispersed phase and hydrocarbon as the continuous phase results in satisfactory aromatics recovery with significant advantages over the prior art. It has been determined that operation with the solvent phase dispersed results in an increased extractor capacity and a reduced capital investment.

Therefore, in accordance with the practice of this invention, the desired objectives may be achieved by a process for the recovery of aromatic hydrocarbons from a mixed hydrocarbon feed stream which comprises passing said feed stream into an extraction means; introducing into the extraction means a hereinafter specified lean solvent composition comprising at least one solvent from the group consisting of sulfolane-type chemicals and sulfolane chemicals; passing said lean solvent composition as a dispersed phase through a continuous phase of hydrocarbon within the extraction means under conditions sufficient to extract aromatic hydrocarbons; withdrawing from the extraction means a raffinate stream comprising non-aromatic hydrocarbons and a rich solvent stream containing aromatic hydrocarbons; separating said rich solvent stream into an aromatic product and into said lean solvent composition specified; and, recovering said aromatic product.

A further embodiment of the present invention comprises passing a mixed hydrocarbon feed stream into an extraction zone comprising a rotating disc contactor; introducing into the extraction zone a hereinafter specified lean solvent composition; passing said lean solvent composition as a dispersed phase through a continuous phase of hydrocarbon within said rotating disc contactor under conditions sufficient to extract aromatic hydrocarbons; withdrawing from the extraction zone a raffinate stream comprising non-aromatic hydrocarbons and a rich solvent stream containing aromatic hydrocarbons; separating said rich solvent stream into an aromatic product and into said leans solvent composition specified; and, recovering said aromatic product.

Solvent extraction of aromatic hydrocarbons from hydrocarbon mixtures in accordance with the foregoing embodiments may effectively employ any suitable solvent, but a more desirable solvent which may be utilized within the practice of the present invention comprises a solvent of the sulfolane type. The solvent possesses a five-membered ring containing one atom of sulfur and four atoms of carbon, with two oxygen atoms bonded to the sulfur atom of the ring. Generally, the sulfolane-type solvents may be indicated as having the following structural formula:

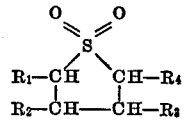

wherein $R_1$, $R_2$, $R_3$, and $R_4$ are independently selected from the group comprising a hydrogen atom, an alkyl group having from one to ten carbon atoms, an alkoxy radical having from one to eight carbon atoms, and an arylalkyl radical having from one to twelve carbon atoms. Other solvents which may be included within this process are the sulfolenes such as 2-sulfolene or 3-sulfolene which have the following structures:

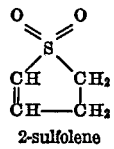   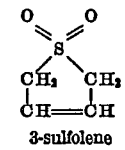

2-sulfolene            3-sulfolene

Other typical solvents which have a high selectivity for separating aromatics from non-aromatic hydrocarbons and which may be processed within the scope of the present invention are 2-methylsulfolane, 2,4-dimethylsulfolane, methyl 2-sulfonyl ether, n-aryl-3-sulfonyl amine, 2-sulfonyl acetate, diethylene glycol, various polyethylene glycols, dipropylene glycol, various polypropylene glycols, dimethyl sulfoxide, N-methyl pyrrolidon, etc.

The specifically preferred solvent chemical which is processed within the scope of the present invention is sulfolane, having the following structural formula:

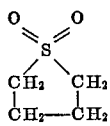

In the art of aromatics extraction, the typical solvent composition comprises a mixture of water and one or more of the solvent chemicals noted. The particularly preferred solvent composition of the present invention comprises water and sulfolane. In extracting aromatic hydrocarbons from a hydrocarbon mixture, it is known that paraffins are the least soluble, followed in increasing order of solubility by naphthenes, olefins, diolefins, acetylenes, sulfur-containing hydrocarbons, nitrogen-containing hydrocarbons, oxygen-containing hydrocarbons, and aromatic hydrocarbons. It is the practice to regulate the solubility of the hydrocarbons within the solvent composition by varying the water content thereof. Thus, by adding more water to the solvent, the solubility of all components in the hydrocarbon mixture is decreased, but the solubility difference between components (selectivity) is increased. The net effect is to decrease the number of contacting stages required to achieve a given purity of aromatic extract, or to increase the resulting purity of the aromatic extract when the number of contacting stages is held constant.

The presence of water in the solvent composition provides a further processing benefit in that it introduces a relatively volatile material into a subsequent extractive stripping column. The water of the solvent composition is vaporized therein and provides assistance in stripping all traces of non-aromatic hydrocarbon out of the aromatic-rich solvent.

It is therefore the practice to provide that the solvent composition contain from about 0.1% to about 20% by weight of water. When the solvent system comprises chemical sulfolane, it is preferably that the solvent composition contain from about 0.1% to about 1.0% water, while a solvent comprising a polyalkylene glycol preferably contains from about 6% to 12% water.

The hydrocarbon charge stocks which are usually processed within the scope of the solvent extraction art are depentanized gasoline boiling range or naphtha boiling range stocks. These stocks will be comprised of hydrocarbons having from about six to twenty carbon atoms per molecule, but normally, aromatics extraction is practiced upon stocks containing only from six to twelve carbon atoms per molecule ($C_6$ to $C_{12}$). Since benzene, toluene, and xylenes are the commercially preferred aromatic hydrocarbons, it is often desirable to fractionate the gasoline or naphtha to provide a concentrate of aromatics in the $C_6$ to $C_8$ range which may then be more effectively solvent-extracted to recover the aromatics contained therein. A preferred source of such an aromatics concentrate is gasoline from a catalytic reforming process. Other sources of such high aromatic concentrates are pyrolysis process by-product liquids and coke oven by-product liquids. The pyrolysis by-product liquids and coke oven liquids are not only rich in aromatics, but are normally high in olefins and diolefins, and it is therefore necessary to hydrotreat these stocks since these unsaturated hydrocarbons reduce the effectiveness of the solvent extraction process.

The process of the present invention may be readily understood by referring now to FIGURE 1 and discussing this schematic diagram with reference to a specific commercial application. A hydrotreated pyrolysis gasoline, having a gravity of 42.3° API and a boiling range of 140° F. to 340° F., is charged into the process at a rate of 480.9 pound moles per hour, or at 3500 barrels per stream day (b.p.s.d.). This feed stock, comprising, for example, 186.1 moles per hour of benzene, 65.5 moles per hour of toluene, 23.3 moles per hour of $C_8$ aromatics, and 0.5 moles per hour of aromatics having nine or more carbon atoms per molecule ($C_9^+$), enters the process via line 1 and passes into extractor 2. The extractor comprises a conventional rotating disc contactor (or RDC column) having, for example, 75 physical stages comprising rotating discs between doughnut stator trays. The feed enters the extractor at a locus such that sixty-four stages are above the feed point (line 1) and eleven stages are below the feed point. Typically, the rotor operates at a speed of 24 r.p.m.

A lean sulfolane solvent composition enters the top of extractor 2 via line 4 at a rate of, for example, 1452 moles per hour, or 9073 b.p.s.d., and at a temperature of 200° F. This solvent composition comprises 1391 moles per hour of chemical sulfolane and 61 moles per hour of water. Extractor 2 is maintained at an elevated pressure of, say, 65 p.s.i.g. in order to keep the hydrocarbon in liquid phase at the operating temperature.

It has been the practice of the prior art to maintain the RDC column 2 liquid full with the sulfolane solvent as the continuous phase and with hydrocarbon droplets dispersed throughout the solvent as the hydrocarbon rises because of its lower density. Under the practice of the present invention, the RDC column contains a continuous liquid phase of hydrocarbon and, as the lean solvent enters extractor 2 via line 4, the rotating discs of the RDC column render the lean solvent composition into a fine dispersion of solvent droplets within the hydrocarbon phase. As the solvent droplets fall from stage to stage through the hydrocarbon and are redispersed by the rotating discs at each stage, the solvent droplets preferentially dissolve the aromatic hydrocarbons from the continuous hydrocarbon phase.

A reflux stream at a temperature of about 100° F. is introduced into the bottom of extractor 2 via line 5 at a rate of, for example 273 moles per hour, or 2206 b.p.s.d. This stream, typically, comprises 81 moles per hour of benzene, 8 moles per hour of toluene, 1 mole per hour of xylenes, and 183 moles per hour of low boiling non-aromatic hydrocarbons. The reflux stream is preferentially soluble in the solvent and as it rises in the extractor it displaces heavier non-aromatic hydrocarbons from the dispersed droplets of solvent which are falling through the hydrocarbon phase. A net paraffinic raffinate stream leaves the top of the extractor via line 3 at a rate of, for example, 213.3 moles per hour, or 1755 b.p.s.d., and comprises 0.4 mole per hour of benzene, 1.3 moles per hour of toluene, and 1.2 moles per hour of xylenes, and 4.9 moles per hour of sulfolane solvent. The raffinate subsequently passes to a solvent recovery system not shown. The final solvent-free raffinate product has a gravity of about 58.5° API and a typical boiling range of 140° F. to 400° F.

This dispersed droplets of aromatic-rich solvent which fall through the extractor 2 are accumulated in the bottom of the vessel to establish a liquid level of solvent phase. This liquid level is maintained in order to provide that no free hydrocarbon phase may leave the bottom of the extractor. The rich solvent is withdrawn from the bottom of extractor 2 through line 6 at a rate of, for example 1992.8 moles per hour, or 13,024 b.p.s.d., and at a temperature of about 168° F. The rich solvent stream containing 545.7 moles per hour of hydrocarbon typically is then passed into an extractive stripping and fractionating system not shown, wherein it is separated to provide, for example, the previously defined lean solvent stream entering extractor 2 via line 4, the previously defined reflux stream entering extractor 2 via line 5, and an aromatic extract. The extract product comprises about 272.5 moles per hour, or 1777 b.p.s.d., of aromatics consisting of 185.7 moles per hour of benzene, 64.2 moles per hour of toluene, 22.1 moles per hour of xylenes, and 0.5 mole per hour of heavier aromatics.

It must be noted in the discussion of the inventive process that the operating conditions described therein are specific to the illustrative embodiment presented. The operating conditions utilized will vary depending upon the hydrocarbon charge stock and the solvent composition utilized, and these conditions may be readily ascertained by those skilled in the art.

As previously noted, extractor 2 will be operated at elevated temperatures and at elevated pressures. The pressure will be maintained sufficient to provide that the hydrocarbon charge stock, the solvent composition, and the reflux will remain in the liquid phase. Suitable pressures are within the range of from about atmospheric pressure to about 400 p.s.i.g., and preferably are in the range of from about 50 p.s.i.g. to about 150 p.s.i.g. The temperatures utilized within the extractor may range from about 80° F. to about 400° F., but normally will range from about 100° F. to about 220° F. The operation at lower temperature, as from about 100° F. to about 150° F., will result in an increase in the selectivity of the solvent but a reduction in the solvency. On the other hand, operation at higher temperatures will increase the solvency but reduce the selectivity. Rotor speed of the rotating disc contactor is generally maintained in the range of from about 15 r.p.m. to about 30 r.p.m. At rotor speeds below this range, the dispersed solvent phase will not be properly redispersed at each rotating disc. This may cause channeling of one or more solvent stream within the extractor resulting in an inadequate degree of contacting between hydrocarbon and solvent thereby resulting in a loss of aromatics recovery and extractor stage efficiency. At rotor speeds above this range, excessive carryover of free solvent phase with the raffinate stream may be encountered.

The advantages of the present invention will be readily seen by the following examples which were obtained on a commercially operating sulfolane extraction unit. Examples I and II illustrate the effectiveness of the extraction according to the prior art where the sulfolane solvent was the continuous phase within the extractor and the hydrocarbon was dispersed throughout. Examples III, IV, and V illustrate the practice of the present invention wherein the hydrocarbon provides the continuous phase within the extractor with the solvent minutely dispersed throughout the hydrocarbon.

EXAMPLE I

A catalytic reformate was charged to an aromatics recovery plant at the rate of 13,770 b.p.s.d. The reformate feed stock had a gravity of 54.9° API and a boiling range of from 170° F. to 311° F. The feed stock contained 37.3 vol. percent aromatic hydrocarbons comprising 1035 b.p.s.d. of benzene, 2472 b.p.s.d. of toluene, 1439 b.p.s.d of xylenes and ethylbenzene, and 193 b.p.s.d. of heavier aromatics. The feed stock entered the extractor column at a temperature of 116° F. wherein it was contacted with a lean solvent comprising sulfolane containing about 0.5 wt. percent water. The lean solvent entered the top of the extractor at 145° F. at a rate of 31,680 b.p.s.d., while a hydrocarbon reflux stream was introduced into the bottom of the extractor at a rate of 2205 b.p.s.d. and a temperature of 126° F. The reflux stream contained 67.6 vol. percent low boiling non-aromatics and 32.4 vol. percent aromatics.

The extractor comprised a rotating disc contactor (RDC) having 37 discs on the rotor. The RDC column was operated with the sulfolane solvent as the continuous phase while a dispersed phase of hydrocarbon droplets passed upflow through the solvent. The discs were rotated at 15 r.p.m. during this test period.

A net reaffinite stream left the top of the extractor at 140° F. at a rate of 9107 b.p.s.d. The raffinate contained 5.28 vol. percent aromatic hydrocarbons comprising 8 b.p.s.d. of benzene, 70 b.p.s.d. of toluene, 272 b.p.s.d. of xylenes and ethylbenzene, and 131 b.p.s.d. of heavier aromatics. A rich solvent stream left the bottom of the RDC extractor at 123° F. and at a rate of 38,250 b.p.s.d. This rich solvent stream was then separated in an extractive stripping column and in an aromatics recovery column to provide the defined lean solvent stream and the defined reflux stream for return to the extractor, and to provide the final aromatic product. The aromatic product was recovered from the process unit at a rate of 4663 b.p.s.d. and was comprised of 1027 b.p.s.d. of benzene, 2402 b.p.s.d. of toluene, 1167 b.p.s.d. of xylene and ethylbenzene, and 62 b.p.s.d. of heavier aromatics Analysis of the aromatic product indicated that it contained only 0.1 vol. percent non-aromatic hydrocarbon.

The operation of the RDC column under the indicated flow rates resulted in a relative liquid velocity of 15.6 mm./sec. where the relative velocity is the sum of the superficial velocity of the continuous phase and the superficial velocity of the continuous phase and the superficial velocity of the dispersed phase. It was determined that the relative velocity of the RDC column at the flood point for this operation was 23 mm./sec., where the flood point is defined as the maximum extractor through-put above which the dispersed phase will be swept out of the tower with the continuous phase. Thus, for this operation the extractor was operating at a capacity of 67.8% of the flood point.

EXAMPLE II

The operation of the RDC column was continued as set forth in Example I with the exception that the speed of rotation of the discs in the extractor was increased from 15 r.p.m. to 28 r.p.m. The liquid flow rates at the extractor and the recovery of aromatic product remained substantially identical to the figures indicated in Example I. The relative velocity of the liquid in the extractor was determined to be 15.5 mm./sec. The relative velocity at the flood point was 23 mm./sec., and the extractor was, therefore, continuing to operate at a capacity of about 67.5% of flood.

EXAMPLE III

In order to reverse the phases within the extractor and establish the hydrocarbon as the continuous phase, the hydrocarbon solvent interface which is normally in the upper settling zone of the RDC column was established at the bottom of the extractor by withdrawing approximately 400 barrels of sulfolane solvent from the extractor. The solvent content of the RDC was thereby reduced from about 120 tons to about 40 tons and the total inventory of the aromatics recovery plant was thereby reduced from approximately 150 tons to 70 tons. The rotor speed of the RDC column was reduced to 15 r.p.m. and maintained at this speed during the test period.

The catalytic reformate defined in Example I was charged to the aromatics recovery plant at the rate of 13,770 b.p.s.d. and at a temperature of 118° F. This hydrocarbon filled the RDC extractor and became the continuous phase therein. Lean solvent containing about 0.5 wt. percent water entered the top of the extractor at 146° F. at a rate of 31,200 b.p.s.d. and dropped through the hydrocarbon as the dispersed phase. The hydrocarbon reflux stream was introduced into the bottom of the extractor at a rate of 2385 b.p.s.d. and a temperature of 134° F. The reflux stream contained 67.6 vol. percent low boiling non-aromatics and 32.4 vol. percent aromatics.

The net raffinate stream left the top of the extractor at 141° F. at a rate of 9220 b.p.s.d. The raffinate contained 6.43 vol. percent aromatic hydrocarbons comprising 14 b.p.s.d. of benzene, 120 b.p.s.d. of toluene, 336 b.p.s.d. of xylenes and ethylbenzene, and 123 b.p.s.d. of heavier aromatics. The rich solvent stream left the bottom of the RDC extractor at 120° F. and at a rate of 38,000 b.p.s.d. This rich solvent stream was then separated in an extractive stripping column and in an aromatics recovery column to provide the defined lean solvent stream and the definde reflux stream for return to the extractor, and to provide the final aromatic product. The aromatic product was recovered from the process unit at a rate of 4550 b.p.s.d. and was comprised of 1021 b.p.s.d. of benzene, 2352 b.p.s.d. of toluene, 1103 b.p.s.d. of xylene and ethylbenzene, and 70 b.p.s.d. of heavier aromatics. Analysis of the aromatic product indicated that it contained only 0.1 vol. percent non-aromatic hydrocarbon.

The operation of the RDC column under the indicated flow rates resulted in a relative liquid velocity of 15.6 mm./sec. and it was determined that the relative velocity of the RDC column at the flood point for this operation was 27 mm./sec. Thus, for this operation the extractor was operating at a capacity of 57.8% of the flood point.

EXAMPLE IV

The extractor continued to operate with the hydrocarbon as the continuous phase and with the solvent as the dispersed phase as set forth in the preceding Example III. However, the rotor speed of the RDC column was increased to 21.5 r.p.m. and maintained at this speed during this test.

The catalytic reformate was charged to the aromatics recovery plant at the rate of 13,770 b.p.s.d. This reformate feed stock differed from the previously defined stock having a gravity of 55.2° API and a boiling range of from 166° F. to 310° F. This feed stock contained 1056 b.p.s.d. of benzene, 2495 b.p.s.d. of toluene, 1410 b.p.s.d. of xylenes and ethylbenzene, and 204 b.p.s.d. of heavier aromatics. The feed stock entered the extractor column at a temperature of 120° F. and established a continuous phase of hydrocarbon therein. It was contacted with the dispersed lean solvent which contained about 0.5 wt. percent water, and which entered the top of the extractor at 150° F. at a rate of 31,200 b.p.s.d. The hydrocarbon reflux stream was introduced into the bottom of the extractor at a rate of 2295 b.p.s.d. and at a temperature of 130° F. The reflux stream contained 67.3 vol. percent low boiling non-aromatics and 32.7 vol. percent aromatics.

The net raffinate stream left the top of the RDC extractor at 144° F. at a rate of 9220 b.p.s.d. The raffinate contained 11 b.p.s.d. of benzene, 134 b.p.s.d. of toluene, 330 b.p.s.d. of xylenes and ethylbenzene, and 144 b.p.s.d. of heavier aromatics. The rich solvent stream left the bottom of the RDC extractor at 120° F. and at a rate of 38,250 b.p.s.d. This rich solvent stream was then separated in an extractive stripping column and in an aromatics recovery column to provide the defined lean solvent stream and the defined reflux stream for return to the extractor and to provide the final aromatic product. The aromatic product was recovered from the process unit at a rate of 4550 b.p.s.d. and was comprised of 1045 b.p.s.d. of benzene, 2361 b.p.s.d. of toluene, 1080 b.p.s.d. of xylene and ethylbenzene, and 60 b.p.s.d of heavier aromatics. Analysis of the aromatic product indicated that it contained only 0.1 vol. percent non-aromatic hydrocarbon.

The operation of the RDC column under the indicated flow rates resulted in a relative liquid velocity of 15.5 mm./sec. and it was determined that the relative velocity of the RDC column at the flood point for this operation was 27 mm./sec. Thus, for this operation the extractor was operating at a capacity of 57.4% of the flood point.

EXAMPLE V

The extractor continued to operate with the hydrocarbon as the continuous phase and with the solvent as the dispersed phase. However, the rotor speed of the RDC column was increased to 28 r.p.m. and maintained at this speed during this test.

The catalytic reformate was charged at the rate of 13,770 b.p.s.d. This reformate feed stock differed from the stocks identified in the previous examples having a gravity of 55.3° API and a boiling range of from 174° F. to 310° F. This feed stock contained 1058 b.p.s.d. of benzene, 2474 b.p.s.d. of toluene, 1394 b.p.s.d. of xylenes and ethylbenzene, and 204 b.p.s.d. of heavier aromatics. The feed stock entered the extractor column at a temperature of 109° F. and established a continuous phase of hydrocarbon therein. It was contacted with the dispersed lean solvent which contained about 0.5 wt. percent water, and which entered the top of the extractor at 144° F. at a rate of 31,200 b.p.s.d. The hydrocarbon reflux stream was introduced into the bottom of the extractor at a rate of 2205 b.p.s.d. and at a temperature of 85° F. The reflux stream contained 67.8 vol. percent low boiling non-aromatics and 32.2 vol. percent aromatics.

The net raffinate stream left the top of the extractor at 139° F. at a rate of 9220 b.p.s.d. The raffinate contained 11 b.p.s.d. of benzene, 119 b.p.s.d. of toluene, 313 b.p.s.d. of xylenes and ethylbenzene, and 142 b.p.s.d. of heavier aromatics. The rich solvent stream left the bottom of the RDC extractor at 115° F. and at a rate of 38,250 b.p.s.d. This rich solvent stream was then separated in an extractive stripping column and in an aromatics recovery column to provide the defined lean solvent stream and the defined reflux stream for return to the extractor, and to provide the final aromatic product. The aromatic product was recovered from the process unit at a rate of 4550 b.p.s.d. and was comprised of 1047 b.p.s.d. of benzene, 2355 b.p.s.d. of toluene, 1081 b.p.s.d. of xylene and ethylbenzene, and 62 b.p.s.d. of heavier aromatics. Analysis of the aromatic product indicated that is contained only 0.1 vol. percent non-aromatic hydrocarbon.

The operation of the RDC column under the indicated flow rates resulted in a relative liquid velocity of 15.4 mm./sec., and the relative velocity of the RDC column at the flood point for this operation was 27 mm./sec. For this operation the extractor was, therefore, operating at a capacity of 57.1% of the flood point.

The foregoing examples demonstrate that for substantially the same liquid flow rates in the extractor, the capacity of the RDC column was greater when operating with the hydrocarbon phase as the continuous phase than operating with the solvent as the continuous phase. As indicated in the examples, the relative velocity at the flooding point was 23 mm./sec. when operating in accordance with the prior art, and 27 mm./sec. when practicing the present invention. Operation of the RDC column with the hydrocarbon as the continuous phase therefore resulted in an increase of extractor capacity in excess of seventeen percent.

It must be noted that while the flooding point or flooding velocity is directly related to the velocities of the two phases, the flood point is also related to the physical properties of the two phases. The liquid density of each phase, liquid viscosity of each phase, and the interfacial tension between the phases will have a distinct effect upon the flood point. Thus, while the effectiveness of operating the RDC extractor with hydrocarbon as the continuous phase has been shown for an extraction employing a solvent of sulfolane and water, the operation will be equally effective for a solvent having similar physical properties. An especially preferred equivalent solvent would be one comprising water with a polyethylene glycol and/or a polypropylene glycol. Some changes in the operating conditions of the RDC extractor may be required in order to accomplish effective results with an equivalent solvent composition. Changes in rotor speed, temperature, pressure, solvent composition water content, etc., which may be required are readily ascertainable by those skilled in the art of aromatics extraction.

It will also be noted from the foregoing examples that by the practice of the present invention the inventory of sulfolane solvent within the aromatics extraction unit was reduced to less than half of the inventory required in a prior art plant. The extraction plant contained about 150 tons of sulfolane when the solvent was the continuous phase within the extractor vessel, but it only contained about 70 tons of solvent when the hydrocarbon was the continuous phase within the extractor. This reduction of expensive sulfolane solvent in the plant inventory results in a substantial economic savings and in a reduced capital expense. While this capital savings is illustrated in the use of an RDC extractor, it must be realized that the practice of operating the extractor with the hydrocarbon as the continuous phase and the sulfolane solvent as the dispersed phase will result in comparable savings regardless of the type of extractor apparatus or vessel used.

The invention claimed:
1. Process for the recovery of monocyclic aromatic hydrocarbons from a feed stream containing mixed hydrocarbons having from six to twelve carbon atoms per molecule which comprises:
   (a) passing said feed stream into an extraction zone comprising a rotating disc contactor;
   (b) introducing into the extraction zone a hereinafter specified lean solvent composition comprising at least one solvent from the group consisting of sulfolane-type chemicals and sulfolene chemicals;
   (c) passing said lean solvent composition as a dispersed phase through a continuous phase of hydrocarbon within said rotating disc contactor under conditions sufficient to extract monocyclic aromatic hydrocarbons;
   (d) withdrawing from the extraction zone a raffinate stream comprising non-aromatic hydrocarbons and a rich solvent stream containing monocyclic aromatic hydrocarbons;
   (e) separating said rich solvent stream into monocyclic aromatic product and into said lean solvent composition specified; and,
   (f) recovering said monocyclic aromatic product.

2. Process of claim 1 wherein said solvent comprises a sulfolane-type chemical of the general formula:

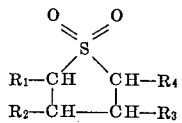

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

3. Process of claim 2 wherein said solvent comprises sulfolane.

4. Process of claim 1 wherein said solvent comprises a sulfolene selected from the group consisting of 2-sulfolene and 3-sulfolene.

References Cited

UNITED STATES PATENTS

| | | | |
|---|---|---|---|
| 2,601,674 | 6/1952 | Reman | 23—270.5 |
| 2,228,434 | 1/1941 | Belden | 208—311 |
| 2,403,485 | 7/1946 | Atwell et al. | 208—311 |
| 2,729,549 | 1/1956 | Reman et al. | 208—311 |
| 3,209,047 | 9/1965 | Young | 208—311 |

HERBERT LEVINE, *Primary Examiner.*

U.S. Cl. X.R.

208—311; 260—674